United States Patent
Immonen et al.

(10) Patent No.: US 8,896,529 B2
(45) Date of Patent: Nov. 25, 2014

(54) APPARATUS, METHODS, AND COMPUTER PROGRAM PRODUCTS PROVIDING CONTEXT-DEPENDENT GESTURE RECOGNITION

(75) Inventors: Olli Immonen, Helsinki (FI); Jukka K. Nurminen, Espoo (FI); Petteri J. Saarinen, Helsinki (FI)

(73) Assignee: Nokia Corporation, Espoo (FI)

( * ) Notice: Subject to any disclaimer, the term of this patent is extended or adjusted under 35 U.S.C. 154(b) by 1692 days.

(21) Appl. No.: 12/221,320

(22) Filed: Jul. 31, 2008

(65) Prior Publication Data
US 2009/0037849 A1    Feb. 5, 2009

Related U.S. Application Data

(60) Provisional application No. 60/963,127, filed on Aug. 1, 2007.

(51) Int. Cl.
*G06F 3/033*    (2013.01)

(52) U.S. Cl.
USPC .......................................... 345/158; 345/156

(58) Field of Classification Search
USPC .......... 345/156–166, 173–179; 715/856–865
See application file for complete search history.

(56) References Cited

U.S. PATENT DOCUMENTS

| | | | |
|---|---|---|---|
| 6,834,249 B2 * | 12/2004 | Orchard .......................... | 702/141 |
| 7,301,529 B2 * | 11/2007 | Marvit et al. ................. | 345/156 |
| 7,365,736 B2 * | 4/2008 | Marvit et al. ................. | 345/156 |
| 2005/0212751 A1 * | 9/2005 | Marvit et al. ................. | 345/156 |
| 2005/0212767 A1 | 9/2005 | Marvit et al. | |
| 2006/0028429 A1 | 2/2006 | Kanevsky et al. | |
| 2010/0100439 A1 * | 4/2010 | Jutla et al. ................... | 705/14.52 |

FOREIGN PATENT DOCUMENTS

| | | |
|---|---|---|
| EP | 1 752 737 A2 | 2/2007 |
| WO | WO 2006/063671 A1 | 6/2006 |

* cited by examiner

*Primary Examiner* — Vijay Shankar
(74) *Attorney, Agent, or Firm* — Harrington & Smith

(57) ABSTRACT

At least some exemplary embodiments of the invention enable the use of context-dependent gestures, for example, in order to assist in the automation of one or more tasks. In one exemplary embodiment, an apparatus senses a predefined gesture and, in conjunction with context information (e.g., location information), performs a predefined action in response to the gesture. As non-limiting examples, the gesture may involve movement of the apparatus (e.g., shaking, tapping) or movement relative to the apparatus (e.g., using a touch screen). In one exemplary embodiment of the invention, a method includes: obtaining context information for an apparatus, wherein the context information includes a predefined context; and in response to sensing a predefined movement associated with the predefined context, performing, by the apparatus, a predefined action, wherein the predefined movement includes a movement of or in relation to the apparatus.

20 Claims, 2 Drawing Sheets

US 8,896,529 B2

APPARATUS, METHODS, AND COMPUTER PROGRAM PRODUCTS PROVIDING CONTEXT-DEPENDENT GESTURE RECOGNITION

CROSS-REFERENCE TO RELATED APPLICATIONS

This patent application claims priority under 35 U.S.C. §119(e) from U.S. Provisional Patent Application No. 60/963,127, filed Aug. 1, 2007, the disclosure of which is incorporated by reference herein in its entirety.

TECHNICAL FIELD

The exemplary embodiments of this invention relate generally to electronic devices and, more specifically, relate to a user interface.

BACKGROUND

Some conventional electronic devices are capable of automating various tasks. For example, most cellular phones can store phone numbers for a speed dial function, for example, whereby a user can place a phone call by pressing and holding one button. As another example, some cellular phones support some form of voice recognition that enables a user to operate the phone by speaking commands. In addition to convenience, such options also provide additional accessibility.

Some electronic devices recognize "gestures" in a limited manner. For example, a game console, the Nintendo® Wii®, utilizes a motion-sensitive controller that enables a user to interact with the console by controller-movement. As another example, various computer programs, such as Opera® and Firefox® web browsers, recognize "mouse gestures" (i.e., gestures performed in conjunction with predefined mouse/cursor movements, usually in conjunction with certain mouse button or key presses).

SUMMARY

The below summary section is intended to be merely exemplary and non-limiting.

In one exemplary embodiment of the invention, a method comprising: obtaining context information for an apparatus, wherein the context information comprises a predefined context; and in response to sensing a predefined movement associated with the predefined context, performing, by the apparatus, a predefined action, wherein the predefined movement comprises a movement of or in relation to the apparatus.

In another exemplary embodiment of the invention, a program storage device readable by an apparatus, tangibly embodying a program of instructions executable by the apparatus for performing operations, said operations comprising: obtaining context information for the apparatus, wherein the context information comprises a predefined context; and in response to sensing a predefined movement associated with the predefined context, performing, by the apparatus, a predefined action, wherein the predefined movement comprises a movement of or in relation to the apparatus.

In another exemplary embodiment of the invention, an apparatus comprising: a context-sensing component configured to obtain context information comprising a predefined context; a movement-sensing component configured to sense movement of or in relation to the apparatus; and a processor configured, in response to the movement-sensing component sensing a predefined movement associated with the predefined context, to perform a predefined action.

In another exemplary embodiment of the invention, an apparatus comprising: means for obtaining context information comprising a predefined context; means for sensing movement of or in relation to the apparatus; and means for performing a predefined action in response to the MSC sensing a predefined movement associated with the predefined context.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Figure 1:
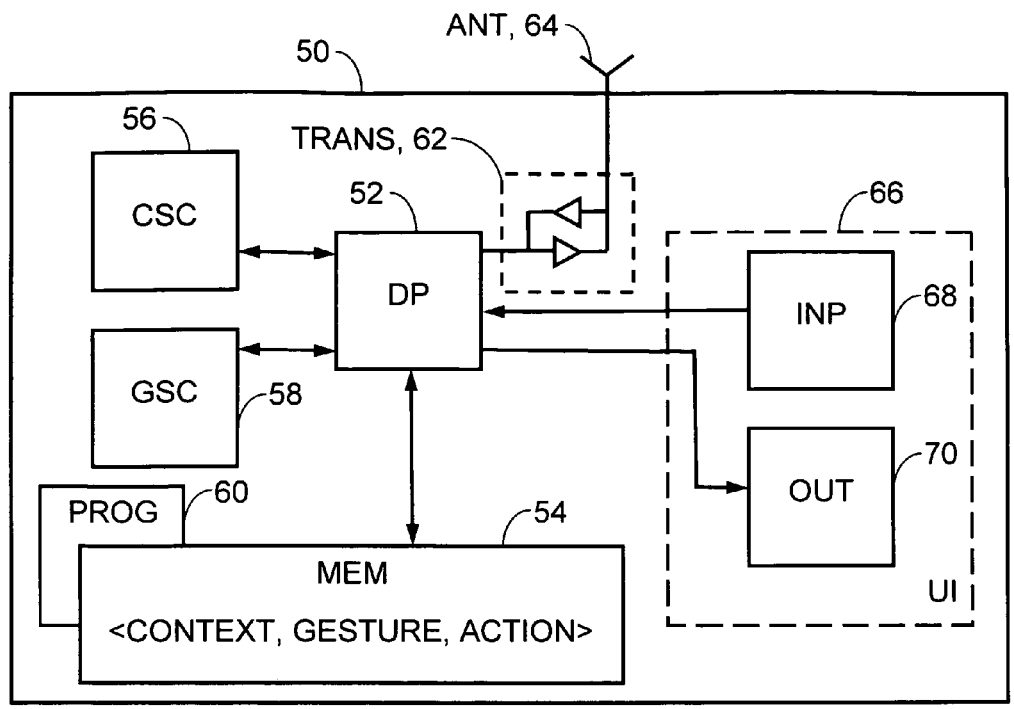
FIG. 1 shows a simplified block diagram of various exemplary electronic devices that are suitable for use in practicing the exemplary embodiments of this invention.

As utilized herein, a "gesture" is herein defined as one or more intentional movements with respect to at least one input portion of a user interface (e.g., a mouse, keyboard, joystick, touchpad, touch screen, keypad, controller). For example, as noted above, a mouse gesture typically is performed by moving the mouse cursor in a predefined manner. As a further example, in the Opera® web browser, holding down the right mouse button and subsequently moving the mouse cursor in a "L" shape (i.e., down then right, as in the shape of an uppercase "L") causes the browser to close the active tab. This use of the mouse to perform an automated task may be considered as a predefined mouse gesture, for example. Note that a gesture may comprise one or more associated inputs or actions, such as a cursor or stylus movement coupled with a key press, for example.

As utilized herein, a "context" is defined as a location, setting or environment. For example, the context within which a gesture is performed may be indicative of one or more of the environment (e.g., situation, environmental conditions, other conditions), time and/or place (e.g., relative location, geographical location, location relative to one or more predefined locations, regions, areas or objects) in which the gesture is performed.

In various situations, a user may wish to operate an electronic device under difficult conditions. For example, a construction worker wearing work gloves may desire to make a phone call with a mobile phone. As another example, a user may have other tasks to focus on, such as operating a vehicle or monitoring meters, and is not available to dial or input a series of numbers to make a phone call. In such situations, it may be desirable to automate one or more tasks associated with placing a call, for example.

The exemplary embodiments of the invention enable the use of context-dependent gestures, for example, in order to assist in the automation of one or more tasks, such as making a phone call or starting or stopping a timer, as non-limiting examples. In one exemplary embodiment, an apparatus (e.g., an electronic device or a mobile device) senses a predefined gesture and, in conjunction with context information (e.g., location information), performs a predefined action in response to the gesture. As non-limiting examples, the gesture may comprise movement relative to the apparatus such as shaking, tapping, stylus movement or other predefined movement of or relative to the apparatus or a component in communication therewith. As a further non-limiting example, a mobile phone equipped with one or more acceleration sensors (e.g., accelerometers) may receive commands and perform various actions in response to a user shaking, tapping or moving the phone in a specified manner. By associating the gesture(s) with a context, the presence of accidental gestures (e.g., that might result in accidental commands) can be mitigated or avoided. Furthermore, since the command or action performed is similarly coupled with the context, this enables an increased number of commands (e.g., tapping the phone twice while it is on a boat performs a different action than tapping the phone twice while it is in a truck).

In one non-limiting, exemplary embodiment, the apparatus comprises a storage structure (e.g., a memory, a database) that stores or associates at least three pieces of information: a context, a gesture and an action. The triplet <context, gesture, action> could be stored, for example, in a relational database or table within the apparatus. In further exemplary embodiments, the apparatus can update a determination of the current context by mechanisms of context sensitivity (e.g., as explained in further detail herein). When the apparatus detects a gesture, it may search the relational database or table using the context and gesture as keys. If a match is found, the apparatus then executes the corresponding action (e.g., as dictated by the triplet).

It should be noted that the "triplet" referred to herein is utilized as a non-limiting example. In further exemplary embodiments, the stored data utilized for performing an action in response to a gesture and a context may comprise a plurality of contexts, a plurality of gestures and/or a plurality of actions. For example, in response to a certain gesture performed when a certain context or condition is met, a series of actions may be performed. As another example, one or more actions may be performed in response to one or more different types of gestures performed within one or more contexts. The specific configuration of these three items may be application-specific, for example. Furthermore, the configuration may comprise any suitable configuration that is capable of implementing or operating in conjunction with the exemplary embodiments of the invention. In other exemplary embodiments, additional data or information may be associated with the stored triplet(s).

There are a number of mechanisms by which the apparatus can sense the current context and/or update such information. The following are presented as non-limiting examples. In practice, any suitable mechanism may be utilized.

The apparatus may sense or determine the current context based on a cradle or other receptacle for the device. For example, the apparatus may determine that it is currently located within a certain automobile when it is situated in a cradle that is known (e.g., predetermined or predefined) to be located within the certain automobile. The apparatus may determine the current context by utilizing the global positioning system (GPS) or another location-determining system, such as wireless network determined device location (e.g., cell location) or triangulation.

The apparatus may utilize one or more sensors to determine the current context. As non-limiting examples, the one or more sensors may comprise: a thermal sensor, an electromechanical servo (servo force balance), a strain gauge, a resonance sensor, a magnetic sensor, a magnetic induction sensor, an optical sensor, a surface acoustic wave (SAW) sensor, an acoustic sensor, a light sensor, an infrared radiation sensor, a receiver and/or a DC response sensor. As further non-limiting examples, the one or more sensors may comprise a radio frequency identification (RFID) component, a Bluetooth® component or another short range wireless component.

The apparatus may utilize a connection to determine the current context. As non-limiting examples, the connection may comprise a serial port connection, a parallel port connection, a small computer system interface (SCSI) connection, a universal serial bus (USB) connection or a firewire (IEEE 1394) connection.

The apparatus may utilize one or more networks or network elements to determine the current context. For example, an apparatus may utilize an access node (e.g., base station, access point, Node B, router, wireless access point wireless router) to which it is currently connected in order to determine a location of the device.

In some exemplary embodiments, the above-identified examples may comprise a means for determining a context (e.g., a current context, a recent context).

There are a number of mechanisms by which the apparatus can sense a gesture. For example, one or more accelerometers and/or gyroscopes may be utilized. As additional non-limiting examples, the apparatus can sense a gesture utilizing: a piezo-film, a piezoelectric sensor, a shear mode accelerometer, a surface micromachined capacitive sensor (a micro electro-mechanical system or MEMS), a bulk micromachined capacitive sensor, a bulk micromachined piezo resistive sensor, a capacitive spring mass based sensor, an electromechanical servo (servo force balance), a null-balance sensor, a strain gauge, a resonance sensor, a magnetic sensor, a magnetic induction sensor, an optical sensor, a surface acoustic wave (SAW) sensor, a laser accelerometer, a DC response sensor, a modally tuned impact hammer and/or a seat pad accelerometer. The above are presented as non-limiting examples. In practice, any suitable mechanism may be utilized. In some exemplary embodiments, the above-identified examples may comprise a means for sensing a gesture.

In response to sensing a gesture within a predefined context, the apparatus performs an action. The action may comprise any suitable, desired action including, but not limited to: placing a phone call, starting or stopping a clock, sending a predefined text message to a predefined target, taking a photograph, playing an audio file (e.g., a predefined audio message, an audio alert, a song), receiving an audio input (e.g., enabling the device to receive an audio command or audio input) and recording sound. The predefined action may comprise any action that can be accomplished by the corresponding software and/or hardware, including, as a non-limiting example, specific application-related actions that normally would be activated via a user input or another user input (e.g., via key pressed on a keypad or keyboard).

Reference is made to FIG. 1 for illustrating a simplified block diagram of various exemplary electronic devices that are suitable for use in practicing the exemplary embodiments of this invention. In FIG. 1, an electronic device 50 includes at least one data processor (DP) 52, at least one memory (MEM) 54 coupled to the DP 52, a context sensing component (CSC) 56 coupled to the DP 52 and a gesture sensing component (GSC) 58 coupled to the DP 52. The MEM 54 may store a program (PROG) 60. The CSC 56 is configured to sense a context of the electronic device 50 as further described herein. The GSC 58 is configured to sense a gesture as further described herein.

The PROG 60 is assumed to include program instructions that, when executed by the associated DP 52, enable the electronic device 50 to operate in accordance with the exemplary embodiments of this invention, as discussed herein.

In general, the various exemplary embodiments of the electronic device 50 can include, but are not limited to, mobile phones (e.g., cellular phones), personal digital assistants (PDAs), portable computers, image capture devices such as digital cameras, gaming devices, music storage and playback appliances, mobile Internet appliances, as well as portable units or terminals that incorporate combinations of such functions.

The exemplary embodiments of this invention may be implemented by computer software executable by the DP 52 of the electronic device 50, or by hardware (e.g., one or more circuits or integrated circuits), or by a combination of software and hardware.

The MEM 54 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DP 52 may be of any type suitable to the local technical environment, and may include one or more of general purpose computers, special purpose computers, microprocessors, digital signal processors (DSPs) and processors based on a multi-core processor architecture, as non-limiting examples.

In further exemplary embodiments, the electronic device 50 may further comprise at least one suitable transceiver (TRANS) 62 coupled to the DP 52. The TRANS 62 may enable bidirectional communication with one or more other electronic devices. In further exemplary embodiments, the TRANS 62 enables bidirectional wireless communication with one or more other electronic devices or components in a wireless communication network (see FIG. 2 and accompanying description below). In such an exemplary embodiment, the electronic device 50 may comprise, as non-limiting examples: a cellular phone, a personal digital assistant (PDA) having wireless communication capabilities, a portable computer having wireless communication capabilities, an image capture device such as a digital camera having wireless communication capabilities, a gaming device having wireless communication capabilities, a music storage and playback appliance having wireless communication capabilities, an Internet appliance permitting wireless Internet access and browsing, as well as a portable unit or terminal that incorporates combinations of such functions. In conjunction with the TRANS 62, further exemplary embodiments of the electronic device 50 may include at least one antenna (ANT) 64.

In further exemplary embodiments, the CSC 56 may comprise the TRANS 62. As a non-limiting example, and as discussed elsewhere herein, the TRANS 62 may be configured to sense a current location of the electronic device 50.

In further exemplary embodiments, the electronic device 50 may comprise a user interface (UI) 66 comprising at least one input component (INP) 68 and/or at least one output component (OUT) 70. The INP 68 may comprise any suitable input component including, but not limited to: one or more keys, one or more buttons, a keypad, a rocker pad, a touch-sensitive component such as a touchpad or a touch screen, an audio input component such as a microphone and/or an optical input component such as a camera or other light sensor. The OUT 70 may comprise any suitable output component including, but not limited to: a visual component such as a display screen or light (e.g., a light emitting diode), a tactile component such as a Braille output or a vibratory component or an audio-producing component such as a speaker or piezoelectric component.

In further exemplary embodiments, the GSC 58 may comprise one or more components of the INP 68. As a non-limiting example, the INP 68 may include a touch screen that acts as the GSC 58 by being sensitive to a number of taps on the touch screen. In further exemplary embodiments, the OUT 70 may be utilized in conjunction with the predefined action performed in response to sensing a predefined movement (by the GSC 58) in light of a predefined context (as obtained or sensed by the CSC 56).

In some exemplary embodiments, the MEM 54 may store data comprising at least one triplet, such as a triplet <context, gesture, action>, for example. As explained in further detail above, data stored on the MEM 54 may comprise any suitable combination that is capable of or used for operating the electronic device 50 in conjunction with the exemplary embodiments of the invention.

Figure 2:
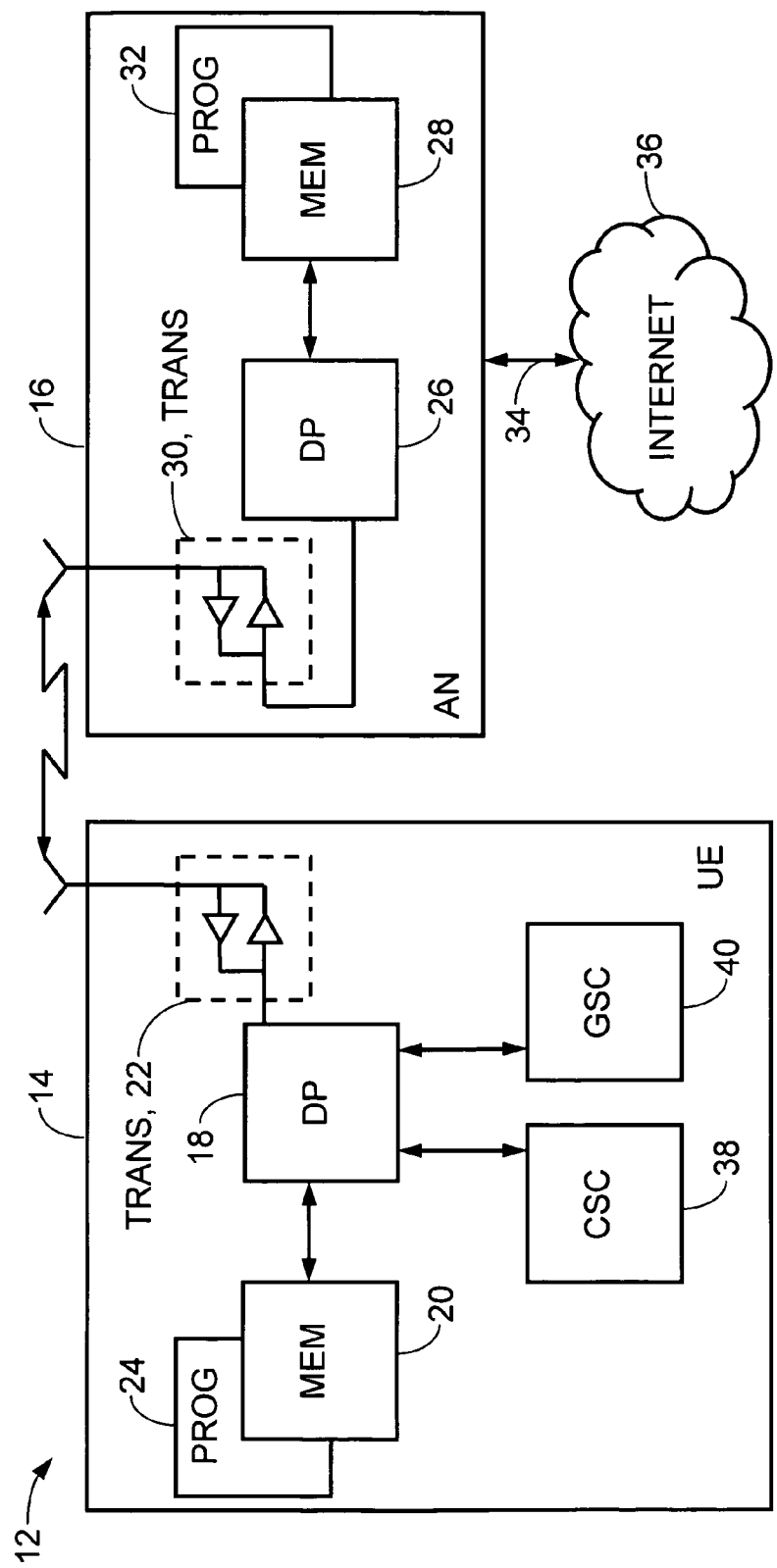
FIG. 2 shows a simplified block diagram of other exemplary electronic devices that are suitable for use in practicing the exemplary embodiments of this invention.

Reference is made to FIG. 2 for illustrating a simplified block diagram of other exemplary electronic devices that are suitable for use in practicing the exemplary embodiments of this invention. In FIG. 2, a wireless network 12 is adapted for communication with a user equipment (UE) 14 via an access node (AN) 16. The UE 14 includes a data processor (DP) 18, a memory (MEM) 20 coupled to the DP 18, a context sensing component (CSC) 38 coupled to the DP 18, a gesture sensing component (GSC) 40 coupled to the DP 18, and a suitable RF transceiver (TRANS) 22 (having a transmitter (TX) and a receiver (RX)) coupled to the DP 18. The MEM 20 stores a program (PROG) 24. The TRANS 22 is for bidirectional wireless communications with the AN 16. Note that the TRANS 22 has at least one antenna to facilitate communication. The CSC 38 is configured to sense a context of the UE 14 as further described herein. The GSC 40 is configured to sense a gesture as further described herein.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the UE 14. Note that the TRANS 30 has at least one antenna to facilitate communication. The AN 16 is coupled via a data path 34 to one or more external networks or systems, such as the internet 36, for example. The PROG 24 is assumed to include program instructions that, when executed by the associated DP 18, enables the UE 14 to operate in accordance with the exemplary embodiments of this invention, as discussed herein.

In general, the various exemplary embodiments of the UE 14 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by the DP 18 of the UE 14, or by hardware, or by a combination of software and hardware.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multicore processor architecture, as non-limiting examples.

Below are provided further descriptions of non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments.

Figure 3:
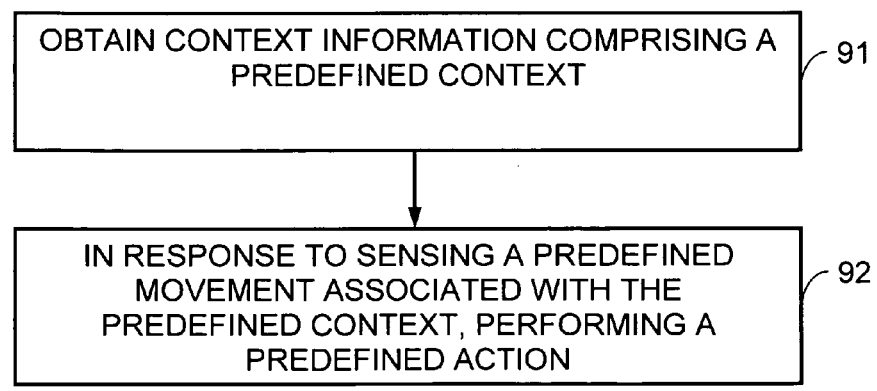
FIG. 3 depicts a flowchart illustrating one non-limiting example of a method for practicing the exemplary embodiments of this invention.

(1) In one non-limiting, exemplary embodiment, and as illustrated in FIG. 3, a method comprising: obtaining context information for an apparatus, wherein the context information comprises a predefined context (91); and in response to sensing a predefined movement associated with the predefined context, performing, by the apparatus, a predefined action, wherein the predefined movement comprises a movement of or in relation to the apparatus (92).

A method as above, wherein obtaining the context information comprises at least one of: determining that the apparatus is situated in a known receptacle (e.g., cradle) or known placement/location, utilizing a global positioning system (GPS), utilizing at least one sensor, utilizing a communication connection to determine a current context or current location, or utilizing one or more networks or network elements to determine a current context (e.g., utilizing an access node such as a base station, access point or Node B). A method as in any of the above, wherein the at least one sensor comprises at least one of the following: a thermal sensor, an electromechanical servo (servo force balance), a strain gauge, a resonance sensor, a magnetic sensor, a magnetic induction sensor, an optical sensor, a surface acoustic wave (SAW) sensor, an acoustic sensor, a light sensor, an infrared radiation sensor, a receiver and/or a DC response sensor. A method as in any of the above, wherein the at least one sensor comprises a radio frequency identification (RFID) component, a Bluetooth® component or another short range wireless component.

A method as in any of the above, wherein the predefined movement is sensed by utilizing at least one sensor. A method as in any of the above, wherein the at least one sensor comprises at least one accelerometer or at least one gyroscope. A method as in any of the above, wherein the at least one sensor comprises at least one of the following: a piezo-film, a piezoelectric sensor, a shear mode accelerometer, a surface micromachined capacitive sensor (a micro electro-mechanical system or MEMS), a bulk micromachined capacitive sensor, a bulk micromachined piezo resistive sensor, a capacitive spring mass based sensor, an electromechanical servo (servo force balance), a null-balance sensor, a strain gauge, a resonance sensor, a magnetic sensor, a magnetic induction sensor, an optical sensor, a surface acoustic wave (SAW) sensor, a laser accelerometer, a DC response sensor, a modally tuned impact hammer and/or a seat pad accelerometer.

A method as in any of the above, wherein the predefined action comprises at least one of: placing a phone call, starting or stopping a clock, sending a predefined text message to a predefined target, taking a photograph, playing an audio message (e.g., a predefined audio message or alert), playing a song, receiving an audio input (e.g., enabling the device to receive an audio command or audio input) or recording sound.

A method as in any of the above, wherein the predefined context, the predefined movement and the predefined action comprise at least one triplet of information stored in a storage portion (e.g., a memory) of the apparatus. A method as in any of the above, wherein the apparatus comprises a mobile phone (e.g., a cellular phone), a personal digital assistant (PDA), a portable computer, an image capture device such as a digital camera, a gaming device, a music storage and playback appliance, a mobile Internet appliance, or a portable unit or terminal.

A method as in any above, wherein the method is implemented by a computer program. A method as in any above, wherein the method is implemented by a program storage device readable by a machine, tangibly embodying a program of instructions executable by the machine for performing operations, said operations comprising the steps of performing the method.

(2) In another non-limiting, exemplary embodiment, a program storage device readable by an apparatus, tangibly embodying a program of instructions executable by the apparatus (e.g., at least one processor of the apparatus) for performing operations, said operations comprising: obtaining context information for the apparatus, wherein the context information comprises a predefined context; and in response to sensing a predefined movement associated with the predefined context, performing, by the apparatus, a predefined action, wherein the predefined movement comprises a movement of or in relation to the apparatus.

A program storage device as recited above, wherein obtaining the context information comprises at least one of: determining that the apparatus is situated in a known receptacle (e.g., cradle) or known placement/location, utilizing a global positioning system (GPS), utilizing at least one sensor, utilizing a communication connection to determine a current context or current location, or utilizing one or more networks or network elements to determine a current context (e.g., utilizing an access node such as a base station, access point or Node B). A program storage device as in any of the above, wherein the at least one sensor comprises a thermal sensor, an electromechanical servo (servo force balance), a strain gauge, a resonance sensor, a magnetic sensor, a magnetic induction sensor, an optical sensor, a surface acoustic wave (SAW) sensor, an acoustic sensor, a light sensor, an infrared radiation sensor, a receiver and/or a DC response sensor. A program storage device as in any of the above, wherein the at least one sensor comprises a radio frequency identification (RFID) component, a Bluetooth® component or another short range wireless component.

A program storage device as in any of the above, wherein the predefined movement is sensed by utilizing at least one sensor. A program storage device as in any of the above, wherein the at least one sensor comprises at least one accelerometer or at least one gyroscope. A program storage device as in any of the above, wherein the at least one sensor comprises at least one of the following: a piezo-film, a piezoelectric sensor, a shear mode accelerometer, a surface micromachined capacitive sensor (a micro electro-mechanical system or MEMS), a bulk micromachined capacitive sensor, a bulk micromachined piezo resistive sensor, a capacitive spring mass based sensor, an electromechanical servo (servo force balance), a null-balance sensor, a strain gauge, a resonance sensor, a magnetic sensor, a magnetic induction sensor, an optical sensor, a surface acoustic wave (SAW) sensor, a laser accelerometer, a DC response sensor, a modally tuned impact hammer and/or a seat pad accelerometer.

A program storage device as in any of the above, wherein the predefined action comprises at least one of: placing a phone call, starting or stopping a clock, sending a predefined text message to a predefined target, taking a photograph, playing an audio message (e.g., a predefined audio message or alert), playing a song, receiving an audio input (e.g., enabling the device to receive an audio command or audio input) and recording sound.

A program storage device as in any of the above, wherein the predefined context, the predefined movement and the predefined action comprise a triplet of information stored in a memory of the apparatus. A program storage device as in any of the above, wherein the apparatus comprises one of a mobile phone (e.g., a cellular phone), a personal digital assistant (PDA), a portable computer, an image capture device such as a digital camera, a gaming device, a music storage and playback appliance, a mobile Internet appliance, or a portable unit or terminal.

A program storage device as in any of the above, wherein the program storage device comprises a memory or other computer-readable medium.

(3) In another non-limiting, exemplary embodiment, an apparatus comprising: a context-sensing component (CSC) configured to obtain context information comprising a predefined context; a movement-sensing component (MSC) configured to sense movement of or in relation to the apparatus; and a processor configured, in response to the MSC sensing a predefined movement associated with the predefined context, to perform a predefined action.

An apparatus as recited above, wherein the CSC comprises at least one of: a connection or sensor configured to connect to or sense a known receptacle (e.g., cradle) or known placement/location, a global positioning system (GPS) component, at least one sensor, a communication connection configured to determine a current context or current location, or a communication component configured to connect to one or more networks or network elements (e.g., utilizing an access node such as a base station, access point or Node B). An apparatus as in any of the above, wherein the CSC comprises at least one of: a thermal sensor, an electromechanical servo (servo force balance), a strain gauge, a resonance sensor, a magnetic sensor, a magnetic induction sensor, an optical sensor, a surface acoustic wave (SAW) sensor, an acoustic sensor, a light sensor, an infrared radiation sensor, a receiver and/or a DC response sensor. An apparatus as in any of the above, wherein the CSC comprises a radio frequency identification (RFID) component, a Bluetooth® component or another short range wireless component.

An apparatus as in any of the above, wherein the MSC comprises at least one sensor. An apparatus as in any of the above, wherein the MSC comprises at least one accelerometer or at least one gyroscope. An apparatus as in any of the above, wherein the MSC comprises at least one of the following: a piezo-film, a piezoelectric sensor, a shear mode accelerometer, a surface micromachined capacitive sensor (a micro electro-mechanical system or MEMS), a bulk micromachined capacitive sensor, a bulk micromachined piezo resistive sensor, a capacitive spring mass based sensor, an electromechanical servo (servo force balance), a null-balance sensor, a strain gauge, a resonance sensor, a magnetic sensor, a magnetic induction sensor, an optical sensor, a surface acoustic wave (SAW) sensor, a laser accelerometer, a DC response sensor, a modally tuned impact hammer and/or a seat pad accelerometer.

An apparatus as in any of the above, wherein the predefined action comprises at least one of: placing a phone call utilizing a transceiver, starting or stopping a clock, sending a predefined text message to a predefined target, taking a photograph, playing an audio message (e.g., a predefined audio message or alert), playing a song, receiving an audio input (e.g., enabling the device to receive an audio command or audio input) and recording sound.

An apparatus as in any of the above, wherein the predefined context, the predefined movement and the predefined action comprise a triplet of information stored in a memory of the apparatus. An apparatus as in any of the above, wherein the apparatus comprises one of a mobile phone (e.g., a cellular phone), a personal digital assistant (PDA), a portable computer, an image capture device such as a digital camera, a gaming device, a music storage and playback appliance, a mobile Internet appliance, or a portable unit or terminal.

An apparatus as in any of the above, further comprising at least one transceiver. An apparatus as in any of the above, further comprising at least one antenna. An apparatus as in any of the above, further comprising at least one memory. An apparatus as in any of the above, further comprising at least one input component. An apparatus as in any of the above, further comprising at least one output component.

(4) In another non-limiting, exemplary embodiment, an apparatus comprising: means for obtaining context information (MOCI) comprising a predefined context; means for sensing movement (MSM) of or in relation to the apparatus; and means for performing a predefined action in response to the MSC sensing a predefined movement associated with the predefined context.

An apparatus as recited above, wherein the MOCI comprises at least one of: a connection or sensor configured to connect to or sense a known receptacle (e.g., cradle) or known placement/location, a global positioning system (GPS) component, at least one sensor, a communication connection configured to determine a current context or current location, or a communication component configured to connect to one or more networks or network elements (e.g., utilizing an access node such as a base station, access point or Node B). An apparatus as in any of the above, wherein the MOCI comprises at least one of: a thermal sensor, an electromechanical servo (servo force balance), a strain gauge, a resonance sensor, a magnetic sensor, a magnetic induction sensor, an optical sensor, a surface acoustic wave (SAW) sensor, an acoustic sensor, a light sensor, an infrared radiation sensor, a receiver and/or a DC response sensor. An apparatus as in any of the above, wherein the MOCI comprises a radio frequency identification (RFID) component, a Bluetooth® component or another short range wireless component.

An apparatus as in any of the above, wherein the MSM comprises at least one sensor. An apparatus as in any of the above, wherein the MSM comprises at least one accelerometer or at least one gyroscope. An apparatus as in any of the above, wherein the MSM comprises at least one of the following: a piezo-film, a piezoelectric sensor, a shear mode accelerometer, a surface micromachined capacitive sensor (a micro electro-mechanical system or MEMS), a bulk micromachined capacitive sensor, a bulk micromachined piezo resistive sensor, a capacitive spring mass based sensor, an electromechanical servo (servo force balance), a null-balance sensor, a strain gauge, a resonance sensor, a magnetic sensor, a magnetic induction sensor, an optical sensor, a surface acoustic wave (SAW) sensor, a laser accelerometer, a DC response sensor, a modally tuned impact hammer and/or a seat pad accelerometer.

An apparatus as in any of the above, wherein the predefined action comprises at least one of: placing a phone call utilizing a transceiver, starting or stopping a clock, sending a predefined text message to a predefined target, taking a photograph, playing an audio message (e.g., a predefined audio message or alert), playing a song, receiving an audio input (e.g., enabling the device to receive an audio command or audio input) and recording sound.

An apparatus as in any of the above, wherein the predefined context, the predefined movement and the predefined action comprise a triplet of information stored in a memory of the apparatus. An apparatus as in any of the above, wherein the apparatus comprises one of a mobile phone (e.g., a cellular phone), a personal digital assistant (PDA), a portable computer, an image capture device such as a digital camera, a gaming device, a music storage and playback appliance, a mobile Internet appliance, or a portable unit or terminal.

An apparatus as in any of the above, further comprising at least one means for communication. An apparatus as in any of the above, further comprising at least one antenna. An apparatus as in any of the above, further comprising at least one means for storing. An apparatus as in any of the above, further comprising at least one means for receiving an input. An apparatus as in any of the above, further comprising at least one means for outputting.

(5) In another non-limiting, exemplary embodiment, an apparatus comprising: context-sensing circuitry (CSC) configured to obtain context information comprising a predefined context; movement-sensing circuitry (MSC) configured to sense movement of or in relation to the apparatus; and processing circuitry configured, in response to the MSC sensing a predefined movement associated with the predefined context, to perform a predefined action.

An apparatus as in the previous, further comprising one or more aspects of the exemplary embodiments of the invention as described in further detail herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device readable by a machine, tangibly embodying a program of instructions executable by the machine for performing operations. The operations comprise steps of utilizing the exemplary embodiments or steps of the method.

Aspects of the above-presented descriptions of exemplary embodiments of the invention may be combined in various manners (e.g., various combinations of dependent claims and/or elements recited therein) provided said combinations are not unfeasible or impracticable.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one memory including computer program instructions, the at least one memory and the computer program instructions being configured to, with the at least one processor, cause the apparatus at least to perform:
   obtain context information for the apparatus, wherein the context information comprises a location, setting or environment within which the apparatus is currently disposed, wherein the context information comprises a predefined context, wherein obtaining the context information for the apparatus does not include sensing movement or orientation of the apparatus; and
   in response to sensing a predefined movement associated with the predefined context, perform at least one predefined action, wherein the predefined movement comprises a movement of or in relation to the apparatus.

2. An apparatus as in claim 1, wherein obtaining the context information comprises at least one of determining a location of the apparatus and utilizing at least one sensor.

3. An apparatus as in claim 1, wherein the apparatus comprises a mobile phone.

4. A method comprising:
   obtaining context information for an apparatus, wherein the context information comprises a location, setting or environment within which the apparatus is currently disposed, wherein the context information comprises a predefined context, wherein obtaining the context information for the apparatus does not include sensing movement or orientation of the apparatus; and
   in response to sensing a predefined movement associated with the predefined context, performing, by the apparatus, at least one predefined action, wherein the predefined movement comprises a movement of or in relation to the apparatus.

5. A method as in claim 4, wherein obtaining the context information comprises determining a location of the apparatus.

6. A method as in claim 4, wherein obtaining the context information comprises utilizing at least one sensor.

7. A method as in claim 4, wherein the at least one predefined action comprises at least one of: starting or stopping a clock on the apparatus, sending a predefined text message from the apparatus, taking a photograph with the apparatus, receiving an audio input at the apparatus, or recording an audio input by the apparatus.

8. A non-transitory computer-readable medium storing a program of instructions executable by an apparatus for performing operations, said operations comprising:
   obtaining context information for the apparatus, wherein the context information comprises a location, setting or environment within which the apparatus is currently disposed, wherein the context information comprises a predefined context, wherein obtaining the context information for the apparatus does not include sensing movement or orientation of the apparatus; and
   in response to sensing a predefined movement associated with the predefined context, performing, by the apparatus, at least one predefined action, wherein the predefined movement comprises a movement of or in relation to the apparatus.

9. A computer-readable medium as in claim 8, wherein obtaining the context information comprises determining a location of the apparatus.

10. A computer-readable medium as in claim 8, wherein obtaining the context information comprises utilizing at least one sensor.

11. A computer-readable medium as in claim 8, wherein the predefined action comprises at least one of: starting or stopping a clock on the apparatus, sending a predefined text message from the apparatus, taking a photograph with the apparatus, receiving an audio input at the apparatus, or recording an audio input by the apparatus.

12. An apparatus comprising:
   a context-sensing component configured to obtain context information comprising a predefined context, wherein the context information comprises a location, setting or environment within which the apparatus is currently disposed, wherein obtaining the context information for the apparatus does not include sensing movement or orientation of the apparatus;
   a movement-sensing component configured to sense movement of or in relation to the apparatus; and
   a processor configured, in response to the movement-sensing component sensing a predefined movement associated with the predefined context, to perform at least one predefined action.

13. An apparatus as in claim 12, wherein the context information comprises a location of the apparatus and the context-sensing component is configured to determine the location of the apparatus.

14. An apparatus as in claim 12, wherein the context-sensing component comprises at least one sensor.

15. An apparatus as in claim 12, wherein the apparatus comprises a mobile device.

16. A method as in claim 4, wherein obtaining the context information comprises at least one of: determining that the apparatus is in a particular cradle or receptacle, utilizing a global positioning system, using a wireless network to determine device location, using a wireless network to triangulate device location, and using cell location within a wireless network.

17. A method as in claim 4, wherein obtaining the context information comprises using at least one of: a thermal sensor, a resonance sensor, a magnetic sensor, a magnetic induction sensor, a radio frequency identification component, a Bluetooth® component, and a short range wireless component.

18. A method as in claim 4, wherein obtaining the context information comprises utilizing a connection.

19. A method as in claim 18, wherein the connection comprises: a serial port connection, a parallel port connection, a small computer system interface connection, a universal serial bus connection, or a firewire connection.

20. A method as in claim 4, wherein obtaining the context information comprises utilizing a component to which the apparatus is currently connected, wherein the component comprises a network element, an access node, a base station, an access point, a Node B, a router, a wireless access point, or a wireless router.

* * * * *